US008965384B2

(12) United States Patent
Oyama

(10) Patent No.: US 8,965,384 B2
(45) Date of Patent: Feb. 24, 2015

(54) BASE STATION AND RADIO PARAMETER-ADJUSTMENT METHOD

(75) Inventor: Teppei Oyama, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 894 days.

(21) Appl. No.: 13/109,618

(22) Filed: May 17, 2011

(65) Prior Publication Data

US 2011/0287771 A1 Nov. 24, 2011

(30) Foreign Application Priority Data

May 21, 2010 (JP) ................................ 2010-117256

(51) Int. Cl.
*H04W 40/00* (2009.01)
*H04W 24/02* (2009.01)
*H04W 88/08* (2009.01)

(52) U.S. Cl.
CPC .............. *H04W 24/02* (2013.01); *H04W 88/08* (2013.01)
USPC ........................................................ 455/446

(58) Field of Classification Search
CPC ..... H04W 24/02; H04W 16/00; H04W 24/10; H04W 88/08
USPC ........................................................ 455/446
See application file for complete search history.

(56) References Cited

U.S. PATENT DOCUMENTS

| 6,985,466 | B1 * | 1/2006 | Yun et al. ....................... 370/335 |
| 2002/0082036 | A1 * | 6/2002 | Ida et al. ......................... 455/522 |
| 2007/0021151 | A1 | 1/2007 | Mori et al. |
| 2010/0105372 | A1 | 4/2010 | Aoyama et al. |

FOREIGN PATENT DOCUMENTS

| EP | 2117135 A1 * | 11/2009 |
| GB | 2358109 A * | 7/2001 |
| JP | 2005-051409 A | 2/2005 |
| JP | 2006-186841 | 7/2006 |
| JP | 2007-36487 A | 2/2007 |
| JP | 2007-306407 | 11/2007 |
| JP | 2008-48107 A | 2/2008 |
| JP | 2008-252253 | 10/2008 |
| WO | WO2007/020737 | 2/2007 |

OTHER PUBLICATIONS

"Japanese Office Action" mailed by JPO and corresponding to Japanese Patent Application No. 2010-117256 on Aug. 20, 2013, Partial English Translation.

* cited by examiner

*Primary Examiner* — Marisol Figueroa
(74) *Attorney, Agent, or Firm* — Myers Wolin, LLC

(57) ABSTRACT

A base station forming a cell based on a value of a radio parameter includes a reception unit configured to receive a signal transmitted from a mobile terminal communicating with the base station, and a processor configured to adjust a value of a radio parameter of the base station based on first and second reception qualities of the mobile terminal, where the first reception quality is a value of a reception quality of a transmission signal of the base station and the second reception quality is a value of a reception quality of a transmission signal of another base station.

11 Claims, 14 Drawing Sheets

BASE STATION AND RADIO PARAMETER-ADJUSTMENT METHOD

CROSS-REFERENCE TO RELATED APPLICATIONS

This application is based upon and claims the benefit of priority from the prior Japanese Patent Application No. 2010-117256 filed on May 21, 2010, the entire contents of which are incorporated herein by reference.

FIELD

The present invention relates to a technology for adjusting the radio parameter of a base station in a mobile communication system.

BACKGROUND

Hitherto, mobile communication systems have been arranged so that a communication provider offering services determines a cell coverage, that is, a service area of each base station (hereinafter simply referred to as a "base station") for communicating with mobile terminals, and sets a radio parameter for the base station to obtain the cell coverage. The radio parameter is, for example, data of power transmitted from the base station to each cell, the height, the pattern, and the tilt angle of an antenna, etc. When the operation of the mobile communication system is started after setting the above-described specified radio parameter, it often becomes difficult to obtain originally planned cell coverages later due to a change in the operation conditions of the mobile communication system and a change in the radio environment (e.g., a change in a path loss occurring due to a newly constructed building). Therefore, the communication provider measures the cell coverage of the base station by measuring the reception power of a radio wave transmitted from the base station with a radio wave-measurement apparatus or the like to maintain the quality of communication services that are offered to a user of the mobile communication system. A cell coverage obtained as a result of the measurement (a measured cell coverage) is compared to an originally planned target cell coverage (a target cell coverage), and the above-described radio parameter is changed at regular intervals or at irregular intervals as appropriate.

On the other hand, a base station configured to automatically set the antenna pattern has been disclosed as a method of dynamically adjusting the above-described radio parameter (e.g., see Laid-open Patent Publication No. 2008-48107). The base station allows for determining the status of radio resources that are used thereby based on the statistic of usage of the radio resources, the usage being observed thereby, and specifying the antenna pattern thereof based on the determined radio resource-use status. The radio resource usage is determined based on the uplink interference amount and/or the total transmission power observed in the cell of the base station.

However, it takes much time and manpower to measure the reception power by using the radio wave-measurement apparatus at regular intervals or at the irregular intervals to obtain the measured cell coverage. Therefore, it is difficult to update the above-described radio parameter at short time intervals even though the radio environment of the mobile communication system may change at all times. Consequently, the above-described radio parameter is not updated at appropriate time, so that the measured cell coverage may diverge from the target cell coverage, that is, many underserved areas may occur.

On the other hand, according to the above-described known method for dynamically adjusting the radio parameter, the base station only considers the amount of radio resources that are used in the cell thereof and does not consider the status of radio links that are established between mobile terminals existing in the cell thereof and other cells. Therefore, the above-described known method may not be appropriate for optimizing the entire communication environment of an area including a plurality of base stations. For example, even though a given base station sets a radio parameter which is appropriate in terms of the radio resource usage, the set radio parameter may not be appropriate for other base stations that are adjacent to the given base station.

SUMMARY

According to an aspect of the invention, a base station forming a cell based on a value of a radio parameter includes a reception unit configured to receive a signal transmitted from a mobile terminal communicating with the base station, and a processor configured to adjust a value of a radio parameter of the base station based on first and second reception qualities of the mobile terminal, where the.first reception quality is a value of a reception quality of a transmission signal of the base station and the second reception quality is a value of a reception quality of a transmission signal of another base station.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

Figure 1:
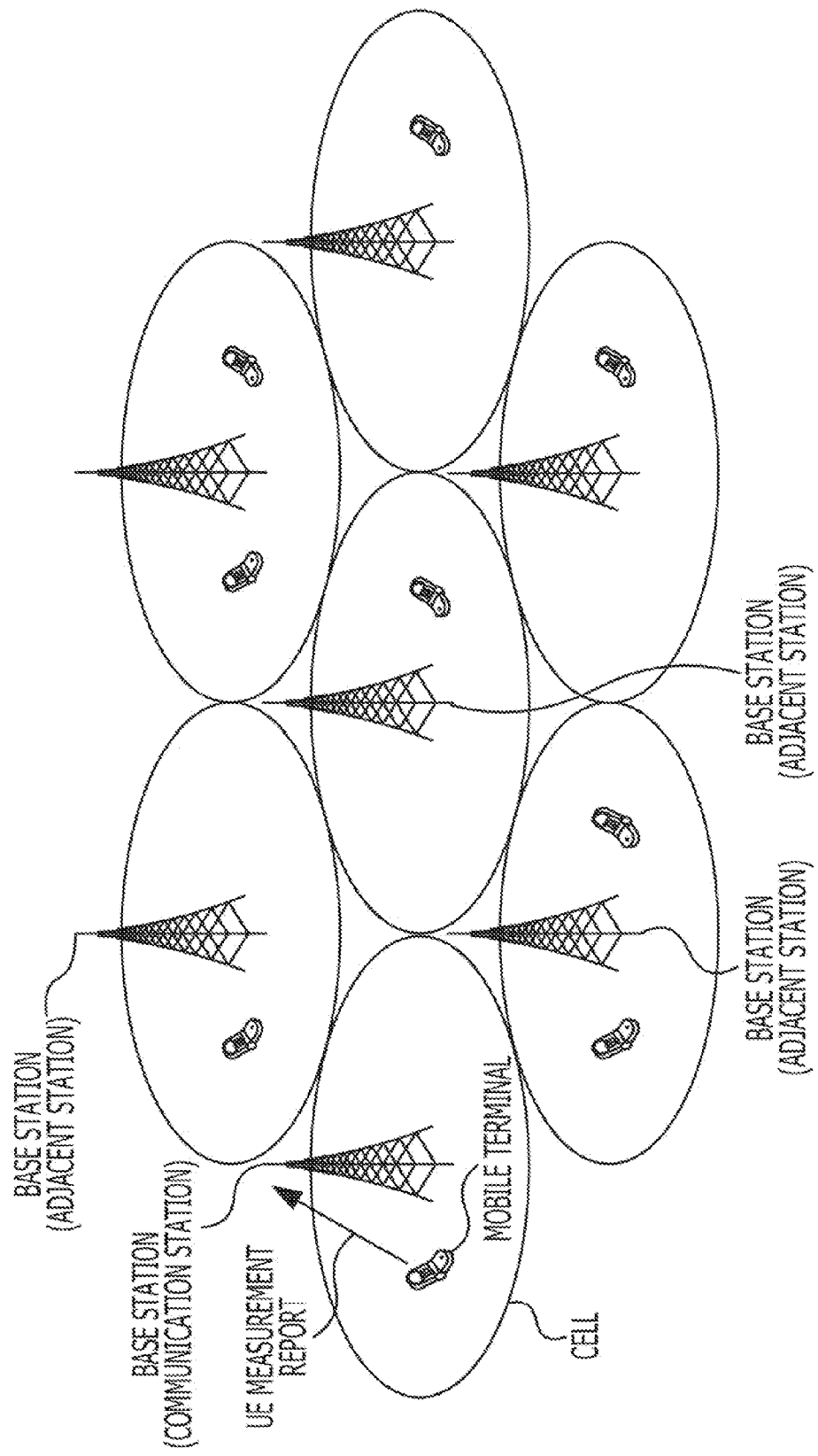
FIG. 1 illustrates the outlines of a radio communication system according to a first embodiment.

DESCRIPTION OF EMBODIMENTS (1) First Embodiment
(1-1) Radio Communication System FIG. 1 illustrates the general outlines of a radio communication system according to the present embodiment. According to the radio communication system, a plurality of base stations (hereinafter simply referred to as "base stations") exist in a specified area, and a cell is provided based on the radio parameter of each of the base stations, as illustrated in FIG. 1. Each of the cells includes a plurality of mobile terminals communicating with the base station. The radio parameter of each of the base stations may be, for example, the transmission power, and the height, the pattern, the azimuth, and the tilt angle of an antenna, etc. In the present embodiment, a radio parameter that may be adjusted with the base station is exemplarily determined to be the tilt angle of the antenna.

Each of the base stations of the radio communication system according to the present embodiment transmits a known reference signal (e.g., a pilot signal) to each of the mobile terminals. Upon receiving the reference signal, each of the mobile terminals measures the reception power of the reference signal, and reports the value of the reception power to the base station communicating with the mobile terminal. At that time, each of the mobile terminals reports not only the value of the reception power of the reference signal transmitted from the base station communicating with the mobile terminal (hereinafter referred to as a "communication station" as appropriate), but also that of the reception power of a reference signal transmitted from each of other stations that are adjacent to the communication station (hereinafter referred to as "adjacent stations" as appropriate) to the communication station as UE measurement report data. The time when the UE measurement report data is transmitted is the time when the mobile terminal is handed over to a different base station, the time when an instruction for transmitting the report data is issued from the communication station, etc.

In the present embodiment, each of the mobile terminals reports not only the value of the reception power of the reference signal transmitted from the communication station, but also that of the reception power of the reference signal transmitted from each of the adjacent stations to the communication station, so as to obtain an evaluation amount with consideration given to the effect of interferences occurring between the cell of the communication station and other cells, where the tilt angle of the antenna is adjusted based on the evaluation amount. In the present embodiment, the downlink reception quality, that is, a downlink average signal to interference plus noise ratio (SINR) is determined to be the evaluation amount, and each of the base stations adjusts the tilt angle of the antenna, which is the radio parameter, based on the evaluation amount.

(1-2) Evaluation Amount Calculated with Base Station

Next, the evaluation amount calculated in each of the base stations for adjusting the tilt angle of the antenna will be described. The evaluation amount is determined to be a downlink average SINR obtained on the assumption that each of mobile terminals that are under the command of each of the base stations communicates with other base stations so that the effect of other cells is appropriately incorporated in the evaluation amount of each of the base stations. The method of calculating the downlink average SINR will be described as below.

Figure 2:
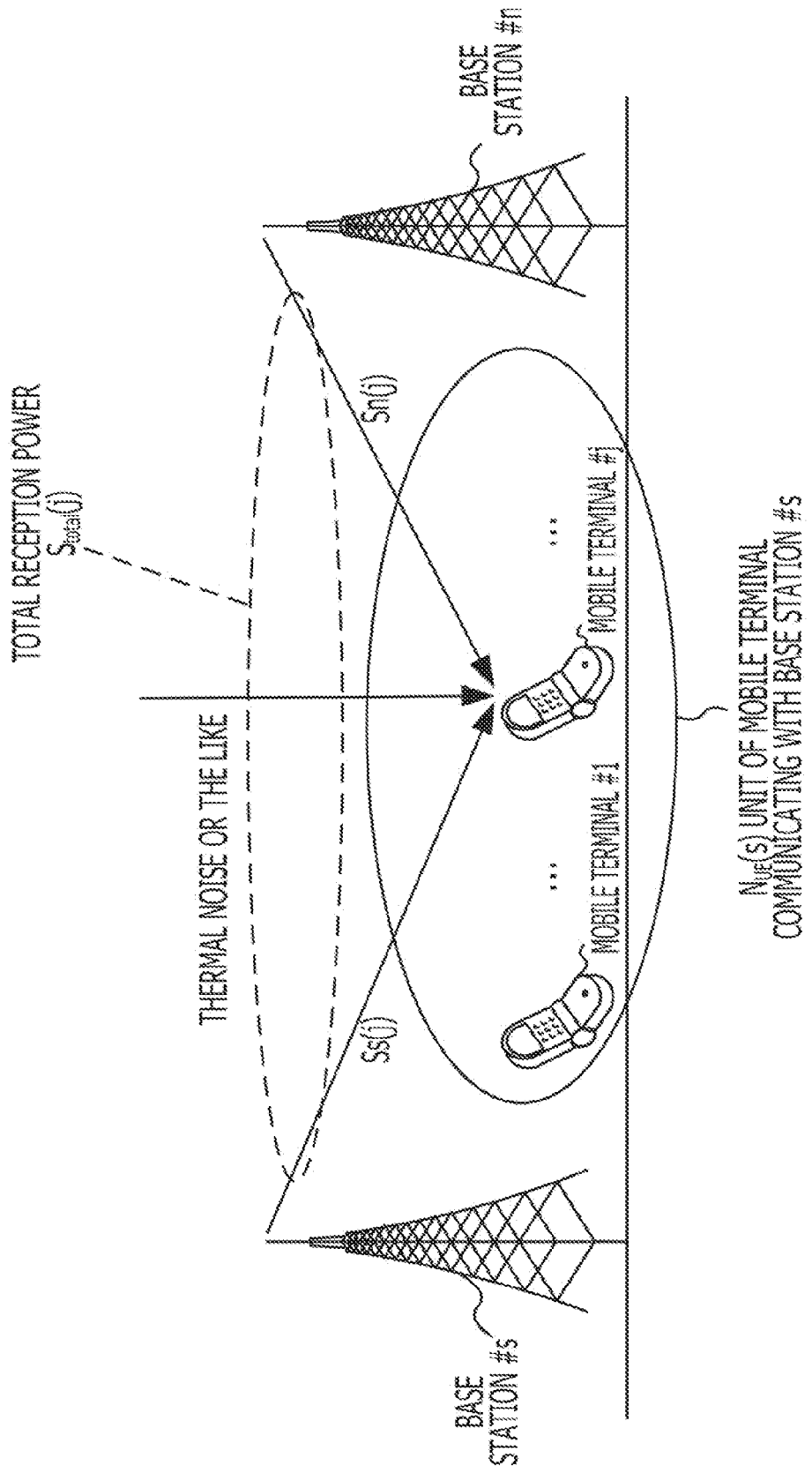
FIG. 2 illustrates circumstances where only a single base station is adjacent to a given base station in a mobile communication system according to the first embodiment.

First, a base station #s communicates with $N_{UE}(s)$ mobile terminals #j (j=1, 2, ..., $N_{UE}(s)$), and only a base station #n is adjacent to the communication station #s as illustrated in FIG. 2. The reception powers of signals that are transmitted from the communication station #s and the adjacent station #n to an arbitrary mobile terminal #j which is under the command of the communication station #s are individually determined to be $S_s(j)$ and $S_n(j)$, and the total reception power including interferences and thermal noises from base stations other than the adjacent station #n is determined to be $S_{total}(j)$. At that time, γj, which is the SINR of the mobile terminal #j, is expressed as Equation (1) that follows.

$$\gamma_j = \frac{S_s(j)}{S_{total}(j) - S_s(j)} \quad (1)$$

According to Equation (1), the average SINR of the communication station #s, which is expressed as γ, is expressed by Equation (2) that follows. In Equation (2), the sign $$\sum_{j \in \#s}$$

denotes that the data items of all of mobile terminals communicating with the communication station #s are summed up.

$$\gamma = \frac{1}{N_{UE}(s)} \sum_{j \in \#s} \gamma_j \quad (2)$$

The average SINR calculated with the communication station #s based on Equation (2), which is expressed as the sign γ, is the average of SINRs of mobile terminals communicating with the communication station #s. In the present embodiment, $\overline{SINR\gamma_j}$ is further calculated on the assumption that the mobile terminal #j communicates with the adjacent station #n so that the effect of other cells is appropriately incorporated in the evaluation amount, as expressed by Equation (3) that follows.

$$\overline{\gamma_j} = \frac{S_n(j)}{S_{total}(j) - S_n(j)} \quad (3)$$

According to Equations (1) and (3), an average $\overline{SINR\gamma}$, which is an evaluation amount consulted to adjust the tilt angle of the antenna with the communication station #s is expressed by Equation (4) that follows.

$$\overline{\gamma} = \frac{1}{N_{UE}(s)} \sum_{j \in \#s} \{\gamma_j + \overline{\gamma_j}\} \quad (4)$$

Figure 3:
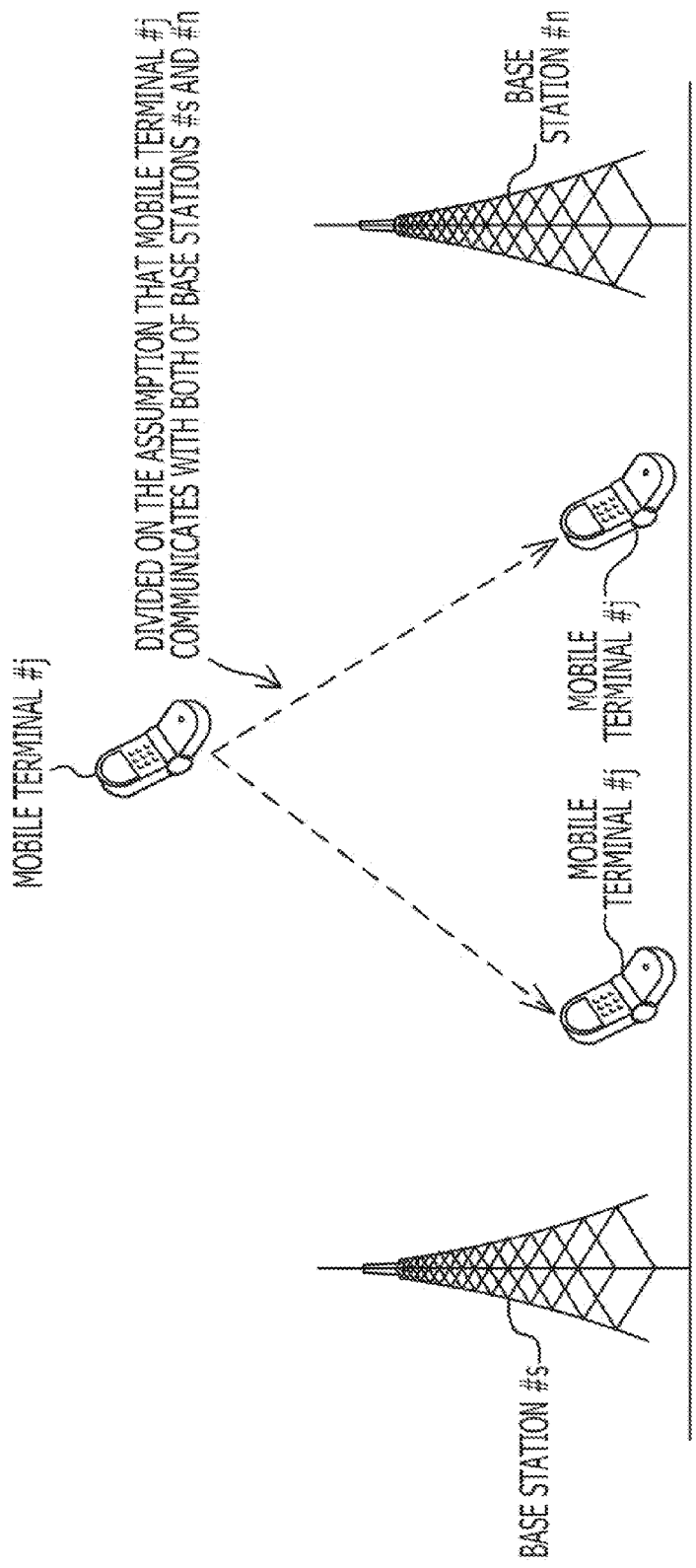
FIG. 3 illustrates circumstances that are founded on the assumption that a mobile terminal communicates with both of a communication station and an adjacent station in the radio communication system according to the first embodiment.

Since Equation (4) holds on the assumption that each of the mobile terminals communicates with the adjacent station #n, it should be noted that a mobile terminal $N_{UE}(s)$ is counted as two terminals in the calculation of Equation (4) even though the mobile terminal $N_{UE}(s)$ is actually a single terminal, as conceptually illustrated in FIG. 3. Accordingly, an appropriate average value is obtained.

In the foregoing discussion, only a single base station is adjacent to the communication station #s. However, when a plurality of base stations is adjacent to the communication station #s, the discussion may be expanded as below.

Figure 4:
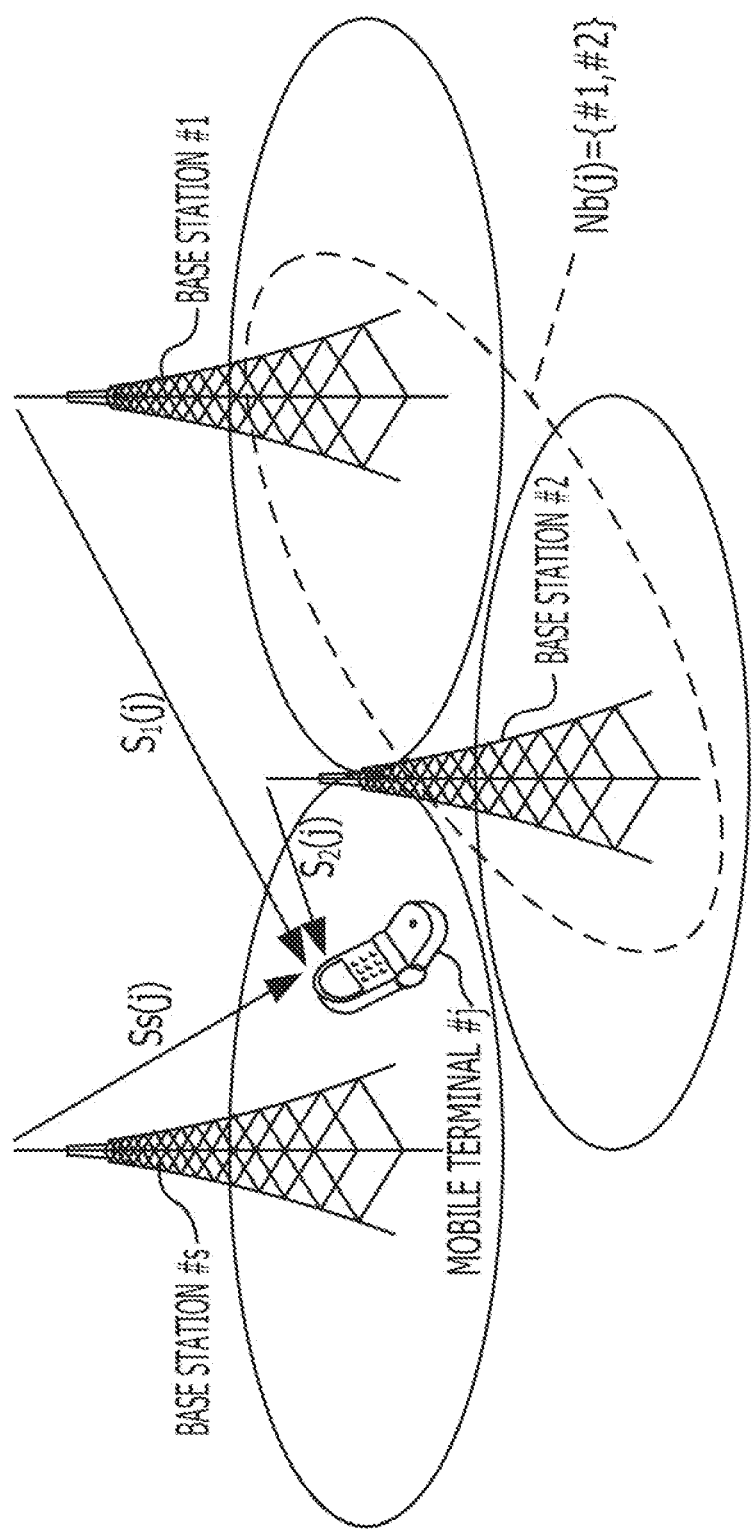
FIG. 4 illustrates examples of circumstances where at least two base stations are adjacent to a given base station in the mobile communication system according to the first embodiment.

First, a set of base stations that are adjacent to the communication station #s with which the mobile terminal #j communicates is expressed as Nb(j), and a definition is made that the expression base station #n ∈ Nb(j) holds when the base station #n is a base station component included in the set Nb(j) (that is, a base station included in the set Nb(j)). FIG. 4 illustrates an example where two base stations #1 and #2 are adjacent to the communication station #s so that the equation Nb(j)={#1, #2} holds. Given that the mobile terminal #j communicates with the base station #n when the expression base station #n ∈ Nb(j) holds, $\overline{SINR\gamma_j}(n)$ is expressed by Equation (5) as is the case with Equation (3) mentioned above.

$$\overline{\gamma_j}(n) = \frac{S_n(j)}{S_{total}(j) - S_n(j)} \quad (5)$$

In accordance with Equations (1) and (5), the average $\overline{SINR\gamma}$, which is the evaluation amount consulted to adjust the tilt angle of the antenna with the communication station #s, is expressed by Equation (6) that follows.

$$\overline{\gamma} = \frac{1}{N_{UE}(s)} \sum_{j \in \#s} \{\gamma_j + \overline{\gamma_j}\} \quad (6)$$

Here, $N_{UE}(s)$ included in equation (6) is expressed by using the number |Nb(j)| of base stations that are included in the set Nb(j) of the base stations that are adjacent to the communication station #s with which the mobile terminal #j communicates, as illustrated in Equation (7). That is, since it is assumed that the mobile terminal #j communicates with the adjacent stations #n that are included in the set Nb(j), it should be noted that the mobile terminal $N_{UE}(s)$ is counted as 1+|Nb(j)| terminals even though the mobile terminal $N_{UE}(s)$ is actually a single terminal.

$$N_{UE}(s) = \sum_{j \in \#s} (1 + |Nb(j)|) \quad (7)$$

In the radio communication system of the present embodiment, the average $\overline{SINR\gamma}$ calculated with each base station based on Equation (4) and/or Equation (6) is determined to be the evaluation amount consulted to adjust the tilt angle of the antenna.

(1-3) Configuration of Base Station

Next, an example of configuration of the base station will be described with reference to FIG. 5 which is a block diagram illustrating the main part of a configuration of the base station.

Figure 5:
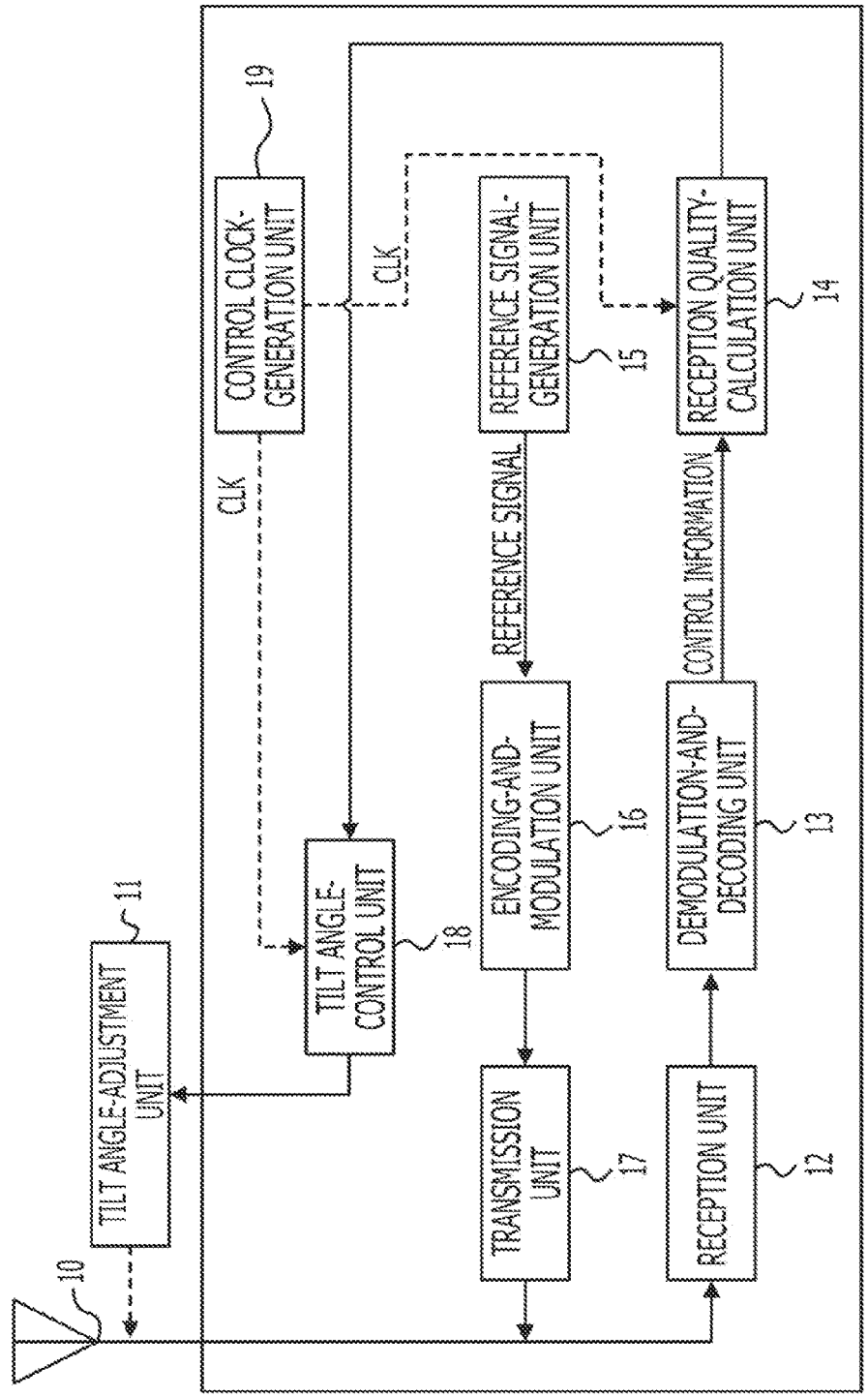
FIG. 5 is a block diagram illustrating the part of a configuration of a base station according to the first embodiment.

Referring to FIG. 5, the base station of the present embodiment includes a transmission/reception antenna 10, a tilt angle-adjustment unit 11, a reception unit 12, a demodulation-and-decoding unit 13, a reception quality-calculation unit 14, a reference signal-generation unit 15, an encoding-and-modulation unit 16, a transmission unit 17, a tilt angle-control unit 18, and a control clock-generation unit 19. The tilt angle-adjustment unit 11 and the tilt angle-control unit 18 constitute an adjustment unit adjusting the value of the radio parameter (the tilt angle of the antenna in the present embodiment) of the base station. The reception unit 12 and transmission unit 17 may be implemented by analog circuits. The functions of the demodulation-and-decoding unit 13, the reception quality-calculation unit 14, the reference signal-generation unit 15, the encoding-and-modulation unit 16, the tilt angle-control unit 18, and the control clock-generation unit 19 may be realized by Central Processing Unit (CPU), Digital Signal Processor (DSP), and Field Programmable Gate Array (FPGA), etc.

The reception unit 12 includes a band-pass filter, a low noise amplifier (LNA), a local frequency generator, an orthogonal demodulator, an automatic gain control (AGC) amplifier, an analog-to-digital (A/D) converter, etc. The reception unit 12 converts an RF signal transmitted from the mobile terminal to the antenna 10 into a digital baseband signal. Further, the reception unit 12 separates the transmitted RF signal into reference signals including a data signal, a control signal, a pilot signal, etc.

The demodulation-and-decoding unit 13 demodulates and decodes the data signal and the control signal. Then, the channel compensation is performed for the data signal and the control signal based on a channel estimation value obtained based on the reference signals that are separated with the reception unit 12.

The reception quality-calculation unit 14 calculates the average $\overline{SINR\gamma}$, as the evaluation amount consulted to adjust the tilt angle of the antenna, for each mobile terminal communicating with the base station including the reception quality-calculation unit 14 based on reception power-report value data included in the transmitted control signal. The control signal transmitted from each of the mobile terminals includes the reception power-report value data of a signal transmitted from the base station including the reception quality-calculation unit 14 and that of a signal transmitted from each of other stations that are adjacent to the base station including the reception quality-calculation unit 14. The average $\overline{SINR\gamma}$ is calculated with the reception quality-calculation unit 14 according to the method illustrated by Equation (4) and/or Equation (7) mentioned above.

The reference signal-generation unit 15 generates the reference signal, which is the base for data of the reception power measured with the mobile terminal, that is, the UE measurement report data.

The encoding-and-modulation unit 16 encodes and modulates the data signal and the control signal of each mobile terminal, and the reference signal generated with the reference signal-generation unit 15. Further, the encoding-and-modulation unit 16 multiplexes the data signal, the control signal, and the reference signal. The reception unit 17 includes a digital-to-analog (D/A) converter, a local frequency generator, a mixer, a power amplifier, a filter, etc. and up-converts a transmission signal obtained by multiplexing the above-described signals from a baseband frequency to a radio frequency, and emits the transmission signal from the antenna 10 to space.

The tilt angle-control unit 18 mainly includes a microcontroller, and executes an algorithm provided to adjust the tilt angle of the antenna 10. The algorithm is provided to determine the amount of tilt angle adjustment so that the average SINR$\bar{\gamma}$ calculated with the reception quality-calculation unit 14 is increased before and after the tilt angle is adjusted. Further, the algorithm is provided to transmit the control signal corresponding to the tilt angle-adjustment amount to the tilt angle-adjustment unit 11.

The tilt angle-adjustment unit 11 adjusts the tilt angle of the antenna 10 based on the control signal transmitted from the tilt angle-control unit 18. A known mechanism may be used as an adjustment mechanism installed in the tilt angle-adjustment unit 11 and the details of the known mechanism will not be described in the present embodiment. Japanese Laid-open Patent Publication No. 2005-051409 discloses an example of mechanical mechanism configured to control the tilt angle of an antenna which is actually tilted by driving a member holding the antenna with a motor. Further, Japanese Patent No. 4040042 discloses an example of electrical mechanism that includes a plurality of antenna units arranged in a vertical direction and that controls the phase of power supplied to each of the antenna units to practically adjust the directivity of the direction of the tilt angle of an antenna without actually tilting the antenna.

The time when the reception quality-calculation unit 14 and the tilt angle-control unit 18 operate is controlled based on a control clock (CLK) signal generated with the control clock-generation unit 19.

(1-4) Operations of Base Station

Next, the operations of the base station, which relate to the adjustment of the tilt angle of the antenna 10, will be described with reference to FIG. 6 which is a flowchart illustrating the operations of the base station, which relate to the adjustment of the tilt angle of the antenna.

First, upon receiving the control clock signal transmitted from the control clock-generation unit 19, the algorithm provided to adjust the tilt angle of the antenna 10 is started in the tilt angle-control unit 18 (YES: operation (S10)). Further, the reception quality-calculation unit 14 calculates the average SINR$\bar{\gamma}$ based on reception power-report value data included in the control signal transmitted from a mobile terminal, as the evaluation amount consulted to adjust the tilt angle of the antenna 10, for each mobile terminal communicating with the base station including the reception quality-calculation unit 14 (operation (S12)), and informs the tilt angle-control unit 18 of the calculated average SINR$\bar{\gamma}$. When the value of the average SINR$\bar{\gamma}$ calculated at operation (S12) is not smaller than a specified target value, no processing is performed.

However, when the average SINR$\bar{\gamma}$ is smaller than the target value (NO: operation (S14)), the tilt angle-control unit 18 controls the tilt angle-adjustment unit 11 so that the tilt angle of the antenna 10 is changed by as much as a specified amount $\Delta\theta$ (operation (S16)).

Figure 6:
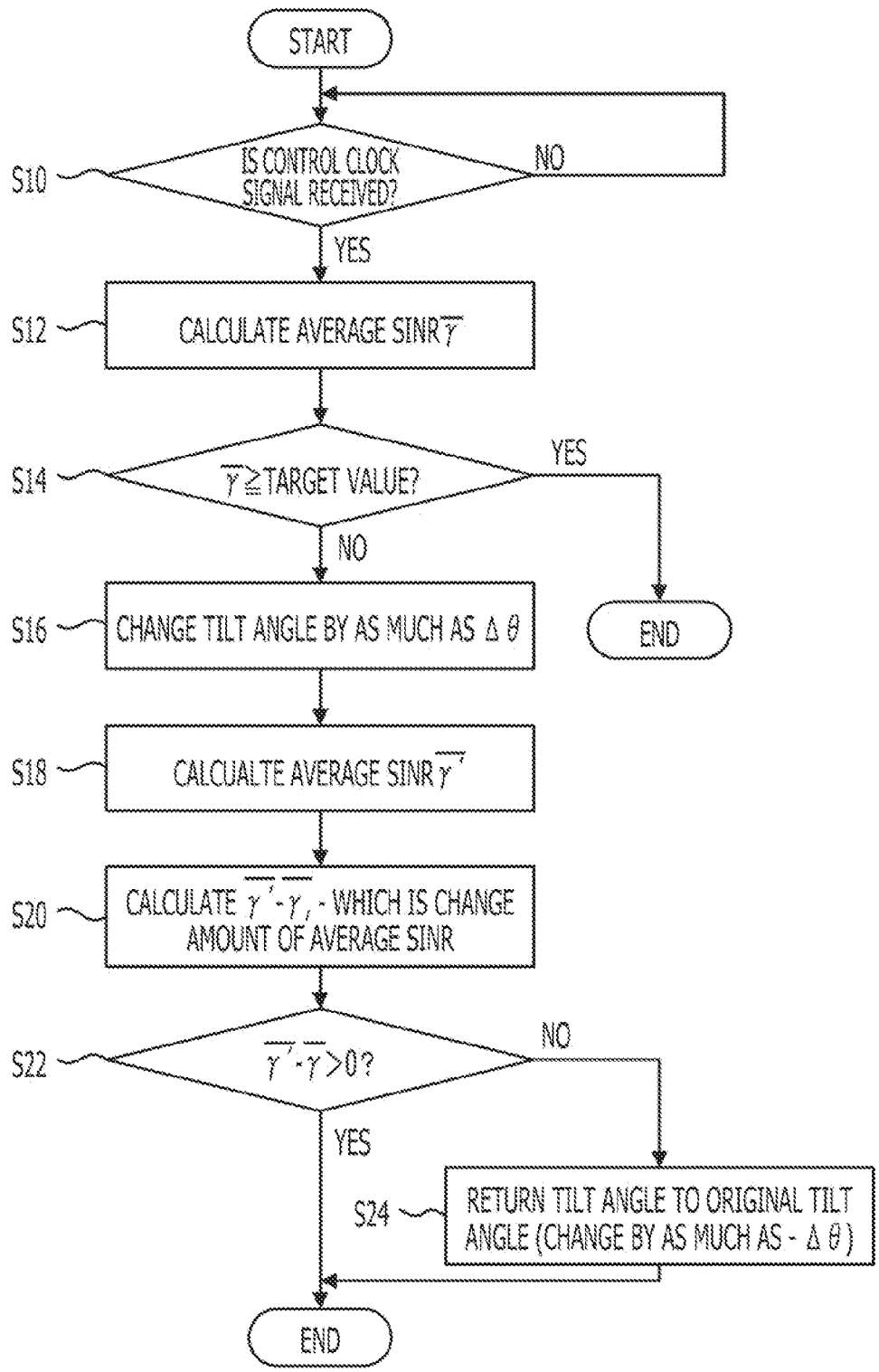
FIG. 6 is a flowchart illustrating the operations of the base station according to the first embodiment, which relate to the adjustment of the tilt angle of the antenna.

Although an operation performed to compare the value of the average SINR$\bar{\gamma}$ to the target value (operation (S14)) is illustrated in the flowchart of FIG. 6, the operation may not necessarily be performed.

Next, the reception quality-calculation unit 14 calculates the average SINR$\bar{\gamma}'$ for each of the mobile terminals communicating with the base station including the reception quality-calculation unit 14 based on the reception power-report value data obtained after the tilt angle of the antenna 10 is changed by as much as the specified amount $\Delta\theta$ (operation (S18)), and informs the tilt angle-control unit 18 of the calculated average SINR$\bar{\gamma}'$. The tilt angle-control unit 18 calculates the difference between the average SINR$\bar{\gamma}$ calculated at operation (S12) and the average SINR$\bar{\gamma}'$ calculated at operation (S18), which is expressed as $(\bar{\gamma}'-\bar{\gamma})$ (operation (S20)). When the expression $(\bar{\gamma}'-\bar{\gamma})>0$ holds (YES: operation (S22)), which denotes that the average SINR achieved as the evaluation amount is improved, the tilt angle-control unit 18 determines that the tilt angle is appropriately adjusted by as much as the specified amount $\Delta\theta$ at operation (S16), and terminates the processing. On the contrary, when the expression $(\bar{\gamma}'-\bar{\gamma})\leq 0$ holds (NO: operation (S22)), which denotes that the average SINR achieved as the evaluation amount is not improved or deteriorated, the tilt angle-control unit 18 determines that the tilt angle is inappropriately adjusted by as much as the specified amount $\Delta\theta$, controls the tilt angle-adjustment unit 11 so that the value of the tilt angle of the antenna 10 returns to that attained before operation (S16) is performed, and terminates the processing.

Here, a direction in which the tilt angle of the antenna 10 is changed by as much as the specified amount $\Delta\theta$ (either a direction in which the tilt angle is changed to become larger or a direction in which the tilt angle is changed to become smaller) at operation (S16) after the algorithm is started may be randomly set with a random number generator, for example. In that case, the value of each of a probability that the direction in which the tilt angle is changed to become larger is set and a probability that the direction in which the tilt angle is changed to become lower is set after the algorithm is started may preferably be 0.5.

When the routine of the present algorithm is finished via operation (S22), a direction in which the tilt angle is changed at operation (S16) performed after the algorithm is started next time may preferably be the same as that in which the tilt angle is changed at operation (S16) of the present algorithm. On the other hand, when the routine of the present algorithm is finished via operation (S24), the direction in which the tilt angle is changed at operation (S16) performed after the algorithm is started next time may preferably be opposite to that in which the tilt angle is changed at operation (S16) of the present algorithm.

As described above, in the mobile communication system according to the present embodiment, the tilt angle of the antenna 10, which is determined to be the radio parameter of a base station, is adjusted based on the evaluation amount determined with consideration given to the effect of interferences occurring between the cell of the communication station and other cells, that is, interferences occurring between a signal transmitted from the communication station to a mobile terminal existing in the cell of the communication station and a signal transmitted from each of adjacent base stations to the mobile terminal. The evaluation amount is calculated based on a first reception quality (equivalent to the above-described $\gamma_j$) which is the value of the reception quality of a signal transmitted from the communication station (the reference signal in the present embodiment) and a second reception quality (equivalent to the above-described) $\overline{\gamma_j}$ which is the value of the reception quality of a signal transmitted from a different base station. Therefore, the effect of the other cells is appropriately incorporated in the result of adjustment of the tilt angle of the antenna 10 of each of the base stations. Consequently, the tilt angle of the antenna 10 may be dynamically set so that a radio environment appropriate for the area covered by a plurality of the base stations including the communication station is achieved.

For example, when there are many mobile terminals near the border of the cell of a specified base station and only the reception quality of each of mobile terminals that are included in the cell of the specified base station is determined to be the evaluation amount consulted to control the tilt angle of an antenna, the tilt angle may be set as a small angle to increase the reception quality of each of the mobile terminals that are near the border of the cell of the specified base station so that the cell coverage is expanded. The above-described tilt angle setting increases the signal interferences occurring in other cells. However, if each of the mobile terminals that are near the border of the cell of the specified base station had already communicated appropriately with a different base station before the tilt angle was adjusted, the above-described tilt angle setting is insignificant for the mobile terminals that are near the border of the cell of the specified base station. Further, the above-described tilt angle setting increases the interferences occurring between the base stations, which deteriorates the communication environment of the entire specified area including the cell of the specified base station. On the contrary, the base station of the present embodiment adjusts the tilt angle of the antenna with consideration given to the reception quality of a signal transmitted from each of other cells to a mobile terminal communicating with the specified base station. Accordingly, it becomes possible to obtain a radio environment appropriate for an area covered by a plurality of base stations including the specified base station.

(2) Second Embodiment

Hereinafter, a mobile communication system according to a second embodiment will be described.

In the mobile communication system of the present embodiment, the average SINR$\overline{\gamma}$ is calculated as the evaluation amount consulted to adjust the tilt angle of the antenna according to a method different from that of the first embodiment. That is, in the first embodiment, $\gamma_j$ and $\overline{\gamma_j}$ of the mobile terminal #j are added to each other at a ratio of 1:1 to calculate the average SINR$\overline{\gamma}$ as indicated by Equation (4) or Equation (6). In the present embodiment, however, weights are determined based on the distances between the mobile terminal #j, and each of the communication station and the adjacent station. The weights are individually assigned to $\gamma_j$ and $\overline{\gamma_j}$ of the mobile terminal #j, and $\gamma_j$ and $\overline{\gamma_j}$ are added to each other. It is estimated that the value of a probability (or expectation) that the mobile terminal #j communicates with a specified mobile station increases with increasing distance between the mobile terminal #j and the specified mobile station. When the evaluation amount is calculated in consideration of the estimation, the evaluation amount properly reflects the actual communication circumstances.

Hereinafter, a method of calculating the average SINR$\overline{\gamma}$ according to the present embodiment will be specifically described.

Figure 7:
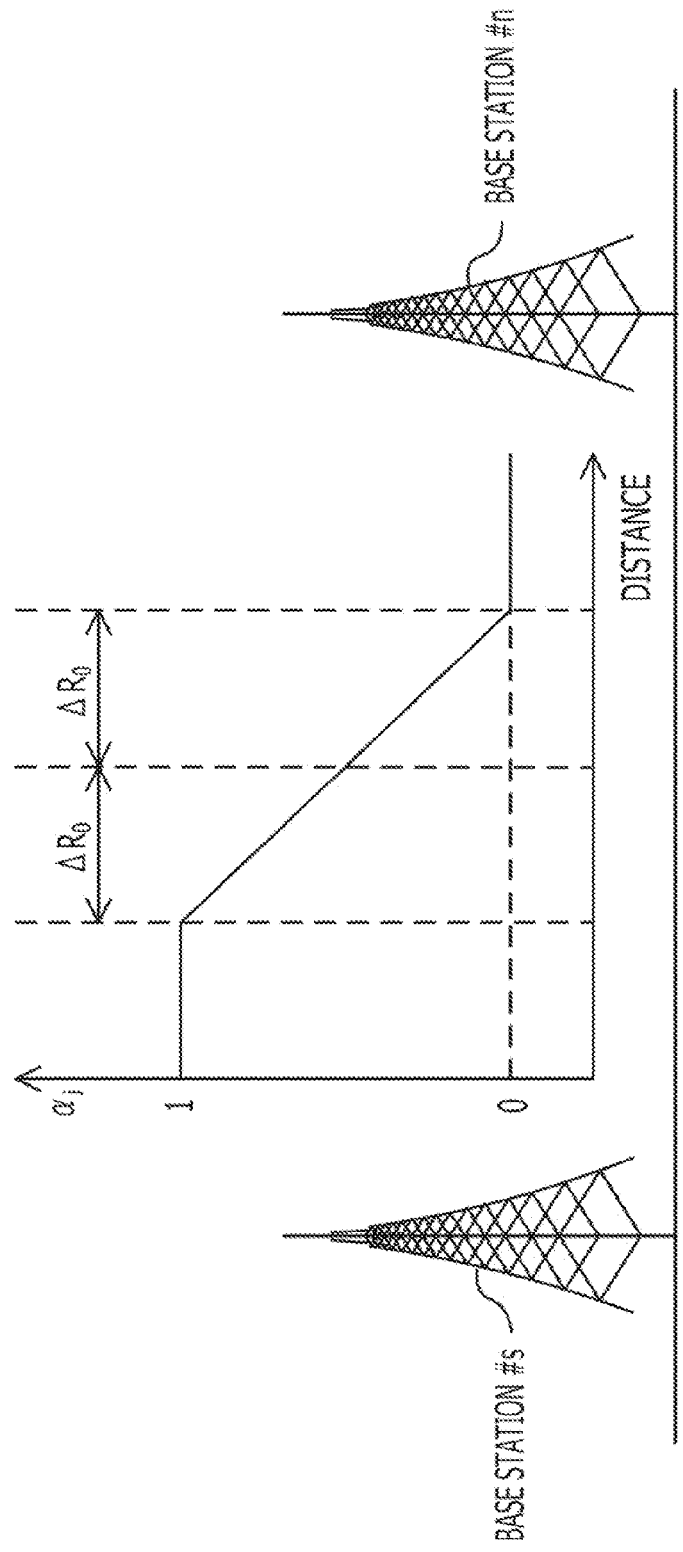
FIG. 7 illustrates an example of weight coefficient set for an average SINR of a mobile terminal moving between a communication station and an adjacent station, the example of weight coefficient changing based on the distance between the mobile terminal and the communication station, in a base station according to a second embodiment.

First, in the present embodiment, the communication station #s communicates with the $N_{UE}(s)$ mobile terminals #j (j=1, 2, . . . , $N_{UE}(s)$), and only the base station #n is adjacent to the communication station #s as illustrated in FIG. 2. Further, a weight coefficient $\alpha_j$ (0≤$\alpha_j$≤1) is defined for an arbitrary mobile terminal #j communicating with the communication station #s as illustrated in FIG. 7. Here, FIG. 7 illustrates an example of weight coefficient $\alpha_j$ set for the distance between the mobile terminal #j and the communication station #s. As exemplarily illustrated in FIG. 7, the weight coefficient $\alpha_j$ is defined in advance as a distance function which is decreased with an increase in the distance between the mobile terminal #j and the communication station #s. Then, the average SINR$\overline{\gamma}$ is calculated according to Equation (8) that follows in the present embodiment.

[Numerical Expression 8]

$$\overline{\gamma} = \frac{1}{N_{UE}(s)} \sum_{j \in \#s} \{\alpha_j \gamma_j + (1 - \alpha_j)\overline{\gamma_j}\} \quad (8)$$

Figure 8:
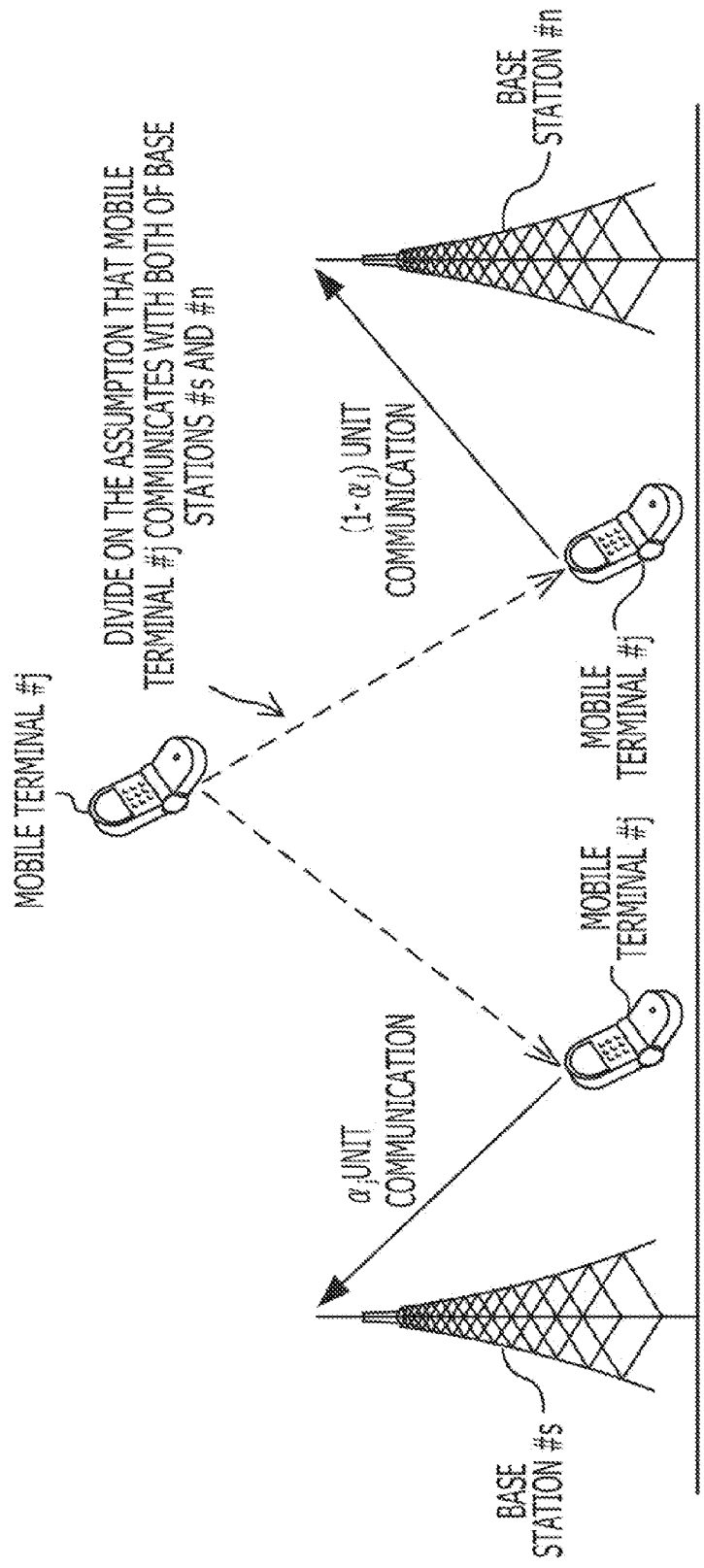
FIG. 8 illustrates circumstances that are founded on the assumption that a mobile terminal communicates with both of the communication station and the adjacent station in a radio communication system according to the second embodiment.

The average SINR$\overline{\gamma}$ is calculated on the assumption that the mobile terminals communicate with the adjacent station #n at a ratio determined based on the weight coefficient $\alpha_j$. That is, as conceptually illustrated in FIG. 8, the average SIRN$\overline{\gamma}$ is calculated on the assumption that $\alpha_j$ (0≤$\alpha_j$≤1) unit of the mobile terminal and 1−$\alpha_j$ unit of the mobile terminal individually communicate with the communication station #s and the adjacent station #n for a single mobile terminal, as an equivalent of the single mobile terminal.

Figure 9:
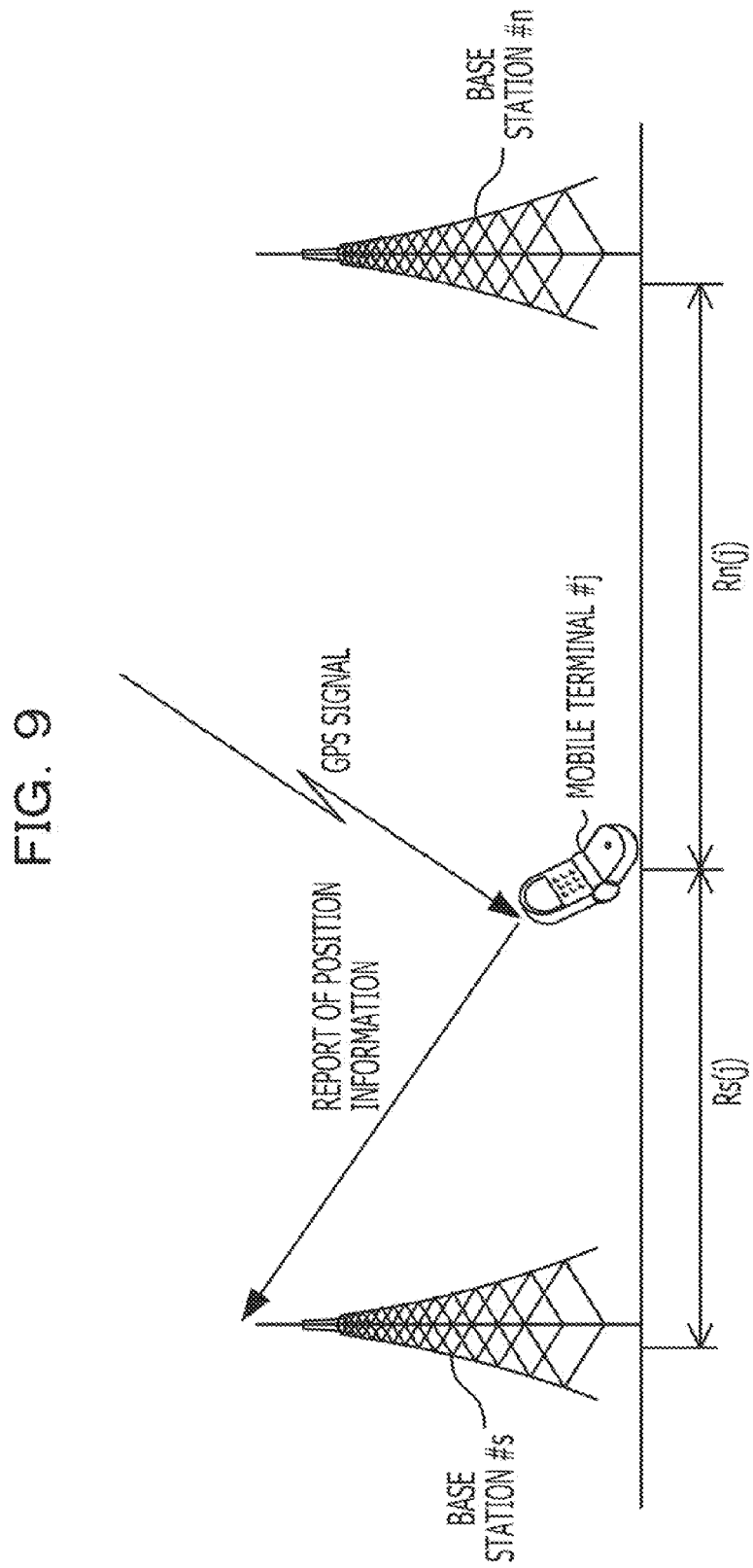
FIG. 9 illustrates a state where each mobile terminal reports position information to the communication station in the radio communication system according to the second embodiment.

Each of the mobile terminals of the present embodiment informs the communication station of information about the position of the mobile terminal successively by measuring the position thereof based on a global positioning system (GPS) signal transmitted from a GPS satellite and incorporating the position information in an uplink control signal as illustrated in FIG. 9. Further, in the radio communication system of the present embodiment, each of the base stations is informed of the position thereof and those of other stations. Then, the communication station #s exemplarily calculates the weight coefficient $\alpha_j$ assigned to the mobile terminal #j according to Equation (9) that follows based on the position information transmitted from the mobile terminal #j, where the difference between the distance $R_n(j)$ between the mobile terminal #j and the adjacent station #n, and the distance $R_s(j)$ between the mobile terminal #j and the communication station #s is determined to be $\Delta R$ (=$R_n(j) - R_s(j)$). According to the example of calculation of the weight coefficient $\alpha_j$, a function linearly decreasing the weight coefficient $\alpha_j$ based on distances (illustrated in Equation (10)) is adopted as illustrated in FIG. 7. The sign $\Delta R_0$ denotes a parameter consulted to determine the weight coefficient $\alpha_j$ and indicates that the weight assignment is performed when the value of $\Delta R$ is less than that of $\Delta R_0$ as illustrated in FIG. 7.

$$\alpha_j = \frac{1}{2}\left\{1 + g\left(\frac{\Delta R}{\Delta R_0}\right)\right\} \quad (9)$$

$$g(x) = \begin{cases} 1 & x > 1 \\ x & -1 < x < 1 \\ -1 & x < -1 \end{cases} \quad (10)$$

Further, even though the example of calculation of the weight coefficient $\alpha_j$ is performed by using the function linearly decreasing the weight coefficient $\alpha_j$ based on the distances as illustrated by Equation (9), an arbitrary function monotonously decreasing the weight coefficient $\alpha_j$ based on distances may be used without being limited to the above-described example of calculation.

According to Equation (9) mentioned above, the equation $\Delta R=0$ holds when the distance between the mobile terminal #j and the communication station #s is equivalent to that between the mobile terminal #j and the adjacent station #n so that the equation $\alpha=0.5$ holds. That is, when the mobile terminal #j is placed on the border between the cell of the communication station #s and that of the adjacent station #n, the same weight is assigned to each of the reception qualities $\gamma_j$ and $\overline{\gamma}_j$, and the reception qualities $\gamma_j$ and $\overline{\gamma}_j$ are added to each other. In actuality, however, the antenna height and the adjusted tilt angle of the communication station #s are different from those of the adjacent station #n. Therefore, the cell radius of the communication station #s is different from that of the adjacent station #n. That is, the border of the cells of the communication station #s and the adjacent station #n is tilted from the midpoint between the communication station #s and the adjacent station #n toward one of the communication station #s and the adjacent station #n, the one having a cell smaller than that of the other. Therefore, the weight coefficient $\alpha_j$ may preferably be corrected based on the difference between the cell radius of the communication station #s and that of the adjacent station #n.

Figure 10:
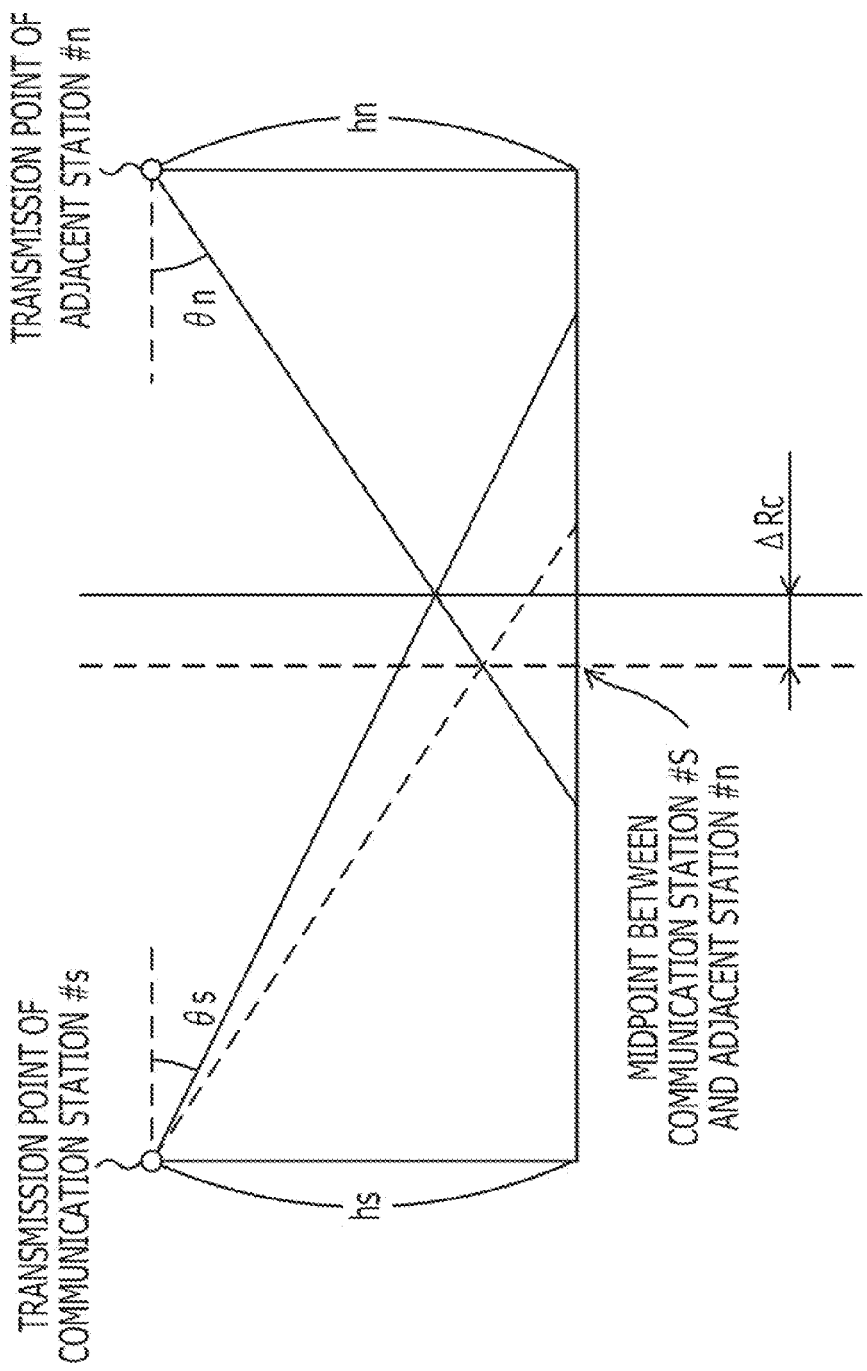
FIG. 10 geometrically illustrates the difference between the cell radius of the communication station and that of the adjacent station, which occurs in the radio communication system according to the second embodiment.

Hereinafter, an example of method of making the correction will be described with reference to FIG. 10. FIG. 10 geometrically illustrates the difference between the cell radius of the communication station #s and that of the adjacent station #n.

The weight coefficient $\alpha_j$ corrected based on the difference between the cell radius of the communication station #s and that of the adjacent station #n is expressed by Equation (11) that follows based on Equation (9) mentioned above. Here, when the distance from the midpoint between the communication station #s and the adjacent station #n to the cell border is determined to be $\Delta R_c$, the distance $\Delta R_c$ is a function obtained where each of the heights hs and hn, and the tilt angles θs and θn of the individual antennas of the communication station #s and the adjacent station #n is determined to be a variable as illustrated in FIG. 10. The function $\Delta R_c$ is expressed by Equation (12) that follows. Although the antenna height of a base station may usually be considered to be fixed and known, the tilt angle of the antenna may be changed by adjustment with time. Therefore, the communication station #s and the adjacent station #n inform each other of information about the tilt angle of the antenna via a specified communication link (an X2 interface when Long Term Evolution (LTE) is used).

$$\alpha_j = \frac{1}{2}\left\{1 + g\left(\frac{\Delta R + \Delta R_c}{\Delta R_0}\right)\right\} \quad (11)$$

$$\Delta R_c = \frac{h_s}{\tan\theta_s} - \frac{h_n}{\tan\theta_n} \quad (12)$$

In the foregoing discussion, only a single base station is adjacent to the communication station #s. However, when a plurality of base stations is adjacent to the communication station #s, the discussion may be expanded as below.

Figure 11:
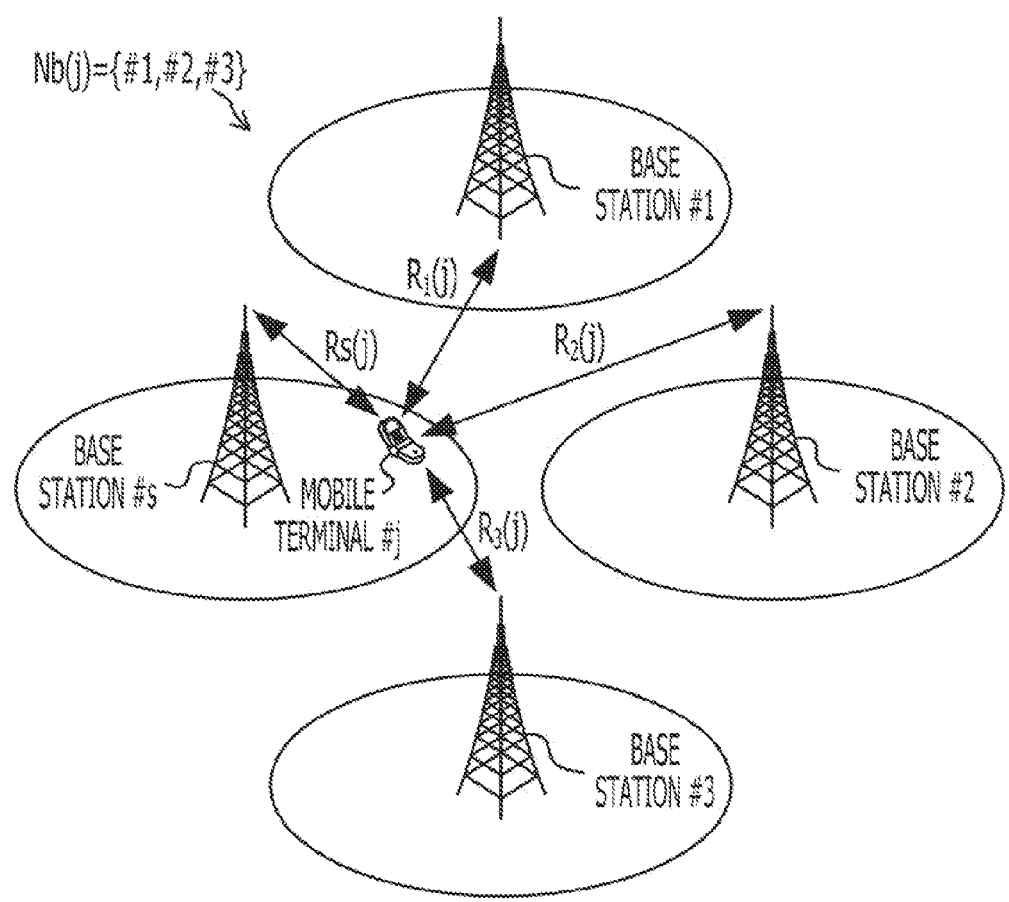
FIG. 11 illustrates examples of circumstances where at least two base stations are adjacent to a given base station in a mobile communication system according to the second embodiment.

First, a set of base stations that are adjacent to the communication station #s with which the mobile terminal #j communicates is expressed by the sign Nb(j), and a definition is made that the expression base station #n ∈ Nb(j) holds when the base station #n is a base station component included in the set Nb(j) (that is, a base station included in the set Nb(j)). FIG. 11 illustrates an example where three base stations #1, #2, and #3 are adjacent to the communication station #s so that the equation Nb(j)={#1, #2, and #3} holds. Further, FIG. 11 illustrates that the distance between the mobile terminal #j and the communication station #s is determined to be Rs(j), and those between the mobile terminal #j and each of the adjacent stations #1 to #3 are determined to be $R_1(j)$, $R_2(j)$, and $R_3(j)$.

Then, the average SINR $\overline{\gamma}$ is expressed by Equation (13) with the use of a weight coefficient $\alpha_{js}$ illustrated in Equation (14) and a weight coefficient $\alpha_{jn}$ illustrated in Equation (15). The weight coefficient $\alpha_{js}$ is assigned to the average SINR $\gamma_j$ of communications that are established between the mobile terminal #j and the communication station #s, and the weight coefficient $\alpha_{jn}$ is assigned to the average SINR $\overline{\gamma}_j(n)$ of communications that are established between the mobile terminal #j and each of the adjacent stations #n (n=0, 1, 2, and so forth).

$$\overline{\gamma} = \frac{1}{N_{UE}(s)} \sum_{j \in \#s} \left\{ \alpha_{js}\gamma_j + \sum_{n \in Nb(j)} \alpha_{jn}\overline{\gamma}_j(n) \right\} \quad (13)$$

$$\alpha_{js} = \frac{1}{|Nb(s)|}\left\{1 + \sum_{n \in Nb(s)} g\left(\frac{\Delta R_n(j)}{\Delta R_0}\right)\right\} \quad (14)$$

$$\alpha_{jn} = \frac{1}{|Nb(s)|}\left\{1 - g\left(\frac{\Delta R_n(j)}{\Delta R_0}\right)\right\} \quad (15)$$

In each of Equations (14) and (15), the sign $\Delta R_n(j)$ indicates the difference $(R_n(j)-R_s(j))$ between the distance $R_s(j)$ between the mobile terminal #j and the communication station #s, and the distance $R_n(j)$ between the mobile terminal #j and the adjacent station #n (where the expression #n ∈ Nb(s) holds). Further, the sign |Nb(s)| indicates the number of base stations that are included in the set Nb(s) of the adjacent stations, that is, the number of the adjacent stations. The value of $$\left(\alpha_{js} + \sum_{n \in Nb(j)} \alpha_{jn}\right),$$

which is the sum total of the weight coefficients $\alpha_{js}$ and $\alpha_{jn}$ that are calculated by Equations (14) and (15), for each of the mobile terminals becomes 1. That is, an average SINR achieved when a single mobile terminal is virtually divided for communication based on the positional relationship between the communication station and each of the adjacent stations is calculated according to Equation (13).

(3) Third Embodiment

Hereinafter, a mobile communication system according to a third embodiment will be described.

According to the above-described embodiments, the average SINR is calculated as the evaluation amount consulted to adjust the tilt angle of the antenna. However, the evaluation amount may be an average communication capacity $\overline{C}$ equivalent to the average SINR. In that case, the average communication capacity $\overline{C}$ is calculated with the reception quality-calculation unit 14 (see FIG. 5). The tilt angle-control unit 18 (see FIG. 5) determines the tilt angle-adjustment amount so that the average communication capacity $\overline{C}$ calculated with the reception quality-calculation unit 14 is increased before and after the tilt angle is adjusted.

An example of method of calculating the average communication capacity $\overline{C}$ is indicated by Equation (16) that follows. Further, $c_j$ and $\overline{c_j}(n)$ that are used in Equation (16) are calculated according to individual Equations (17) and (18) that are known as the Shannon's communication capacity equations, and Equation (16) is achieved by replacing $\gamma_j$ and $\overline{\gamma_j}$ of Equation (13) with individual $c_j$ and $\overline{c_j}(n)$.

$$\overline{C} = \frac{1}{N_{UE}(s)} \sum_{j \in \#s} \left\{ \alpha_{js} c_j + \sum_{n \in Nb(j)} \alpha_{jn} \overline{c_j}(n) \right\} \quad (16)$$

$$c_j = \log(1 + \gamma_j) \quad (17)$$

$$\overline{c_j}(n) = \log\{1 + \overline{\gamma_j}(n)\} \quad (18)$$

(4) Fourth Embodiment

Hereinafter, a fourth embodiment will be described. In the present embodiment, a desirable configuration of the control clock-generation unit 19 (see FIG. 5) of the base station will be described with reference to each of FIGS. 12A and 12B.

Figure 12A:
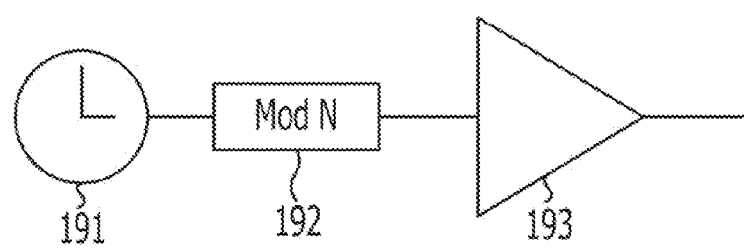
FIG. 12A illustrates a desirable configuration of a control clock-generation unit of a base station according to a fourth embodiment.

The control clock-generation unit 19 illustrated in FIG. 12A includes a timer 191, a modulo calculator 192, and a signal generator 193. The timer 191 measures the time after the base station is powered. For example, information about a value of the time measured in seconds after the base station is powered is transmitted to the modulo calculator 192. When the value of time intervals at which control clock signals are transmitted is exemplarily determined to be N seconds (N: an integer), the modulo calculator 192 finds a residue modulo N, and transmits data of the residue to the signal generator 193. When the value of input data is a specified value such as 0, the signal generator 193 outputs the control clock signal. The above-described configuration allows for transmitting the control clock signals to each of the tilt angle-control unit 18 and the reception quality-calculation unit 14 at the N (second) intervals so that the algorithm is started.

Figure 12B:
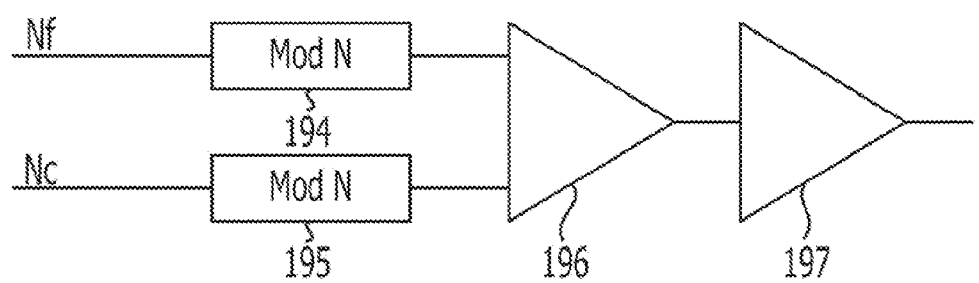
FIG. 12B illustrates another desirable configuration of the control clock-generation unit of the base station according to the fourth embodiment.

The control clock-generation unit 19 illustrated in FIG. 12B includes a modulo calculators 194 and 195, a subtractor 196, and a signal generator 197. In the present embodiment, information about the sign Nf determined to be a frame number given to a radio frame generated with the base station is transmitted to the modulo calculator 194, and information about the sign Nc determined to be an ID unique to the base station (a cell ID) is transmitted to the modulo calculator 195. When the time intervals at which the control clock signals are transmitted is exemplarily determined to be the intervals of N (frames), the modulo calculator 194 finds a residue modulo N (N: an integer) of the above-described Nf, and transmits information about the residue to the subtractor 196. When the value of the time intervals at which the control clock signals are transmitted is exemplarily determined to be the intervals of N (frames), the modulo calculator 195 finds a residue modulo the integer N of the above-described Nc, and transmits information about the residue to the subtractor 196. When the value of input data transmitted from the subtractor 196 is 0, the signal generator 197 outputs the control clock signal. The above-described configuration allows for transmitting the control clock signals at the N (frame) intervals to each of the tilt angle-control unit 18 and the reception quality-calculation unit 14 so that the algorithm is started. Further, since the time when the control clock signal is output is determined based on the cell ID, the algorithms are prevented from being started at the same time between adjacent cells, which contributes to an increased convergence of the algorithm within a specified area.

(5) Fifth Embodiment

Hereinafter, a fifth embodiment will be described.

A base station according to the present embodiment changes the intervals at which the control clock signals are transmitted from the control clock-generation unit 19 and/or the change amount of the tilt angle (the specified amount $\Delta\theta$ of operation (S16) illustrated in FIG. 6) based on a change in the average SINR (operation (S20) illustrated in FIG. 6). More specifically, when the change amount of the average SINR, which is obtained at operation (S20), is larger than a specified value, the intervals at which the control clock signals are transmitted from the control clock-generation unit 19 is reduced so that the algorithm is started with increased frequency. Consequently, the algorithm is converged at an early stage. Further, when the change amount of the average SINR, which is obtained at operation (S20), is larger than a specified value, the tilt angle-change amount $\Delta\theta$ of operation (S16) illustrated in FIG. 6 is increased so that the algorithm is converged at an early stage. The above-described processing procedures may be performed in the following manner. That is, when the change amount of the average SINR (operation (S20) illustrated in FIG. 6) is determined to be $\Delta T$, the base station calculates the intervals N at which the control signals are transmitted based on the equation $N=\text{Int}(\alpha-\beta\Delta T)$. Further, the base station calculates the modulus $|\Delta\theta|$ of the change amount of the tilt angle based on $\gamma\Delta T$. Here, each of the signs $\alpha$, $\beta$, and $\gamma$ denotes an arbitrary constant, and the sign Int( ) denotes a function discarding digits to the right of the decimal point.

The above-described control clock-transmission intervals and/or the tilt angle-change amount may be changed from a different viewpoint. For example, when a failure occurs in a given base station included in the radio communication system, a mobile terminal existing in the cell coverage of the given base station is covered by a base station adjacent to the given base station due to the failure of the certain base station. In such cases, the cell coverage of the adjacent base station may preferably be expanded at an early stage. In terms of the above-described cell coverage-expansion, the base station may reduce the above-described control clock-transmission intervals and/or increase the tilt angle-change amount upon receiving notification information indicating the failure, the notification information being transmitted from the adjacent base station through the X2 interface or the like.

(6) Sixth Embodiment

Hereinafter, a sixth embodiment will be described.

In the second embodiment, the weight coefficient $\alpha_{js}$ is calculated based on the distance $R_s(j)$ between the mobile terminal #j and the communication station #s, and the weight coefficient $\alpha_{jn}$ is calculated based on the distance $R_n(j)$ between the mobile terminal #j and the adjacent station #n (where the expression #n $\in$ Nb(s) holds). In the present embodiment, however, a different method for calculating the weight coefficients $\alpha_{js}$ and $\alpha_{jn}$ will be described. In the present embodiment, the weight coefficients $\alpha_{js}$ and $\alpha_{jn}$ are calculated based on the reception power-report value used to calculate the SINR in place of the above-described distances $R_s(j)$ and $R_n(j)$. That is, since it is estimated that a path loss occurring during radio propagation is monotonously changed based on the distance between the base station and the mobile terminal, it may be determined that the distance between the base station and the mobile terminal is increased with a decrease in the reception power-report value of the mobile terminal.

Figure 13:
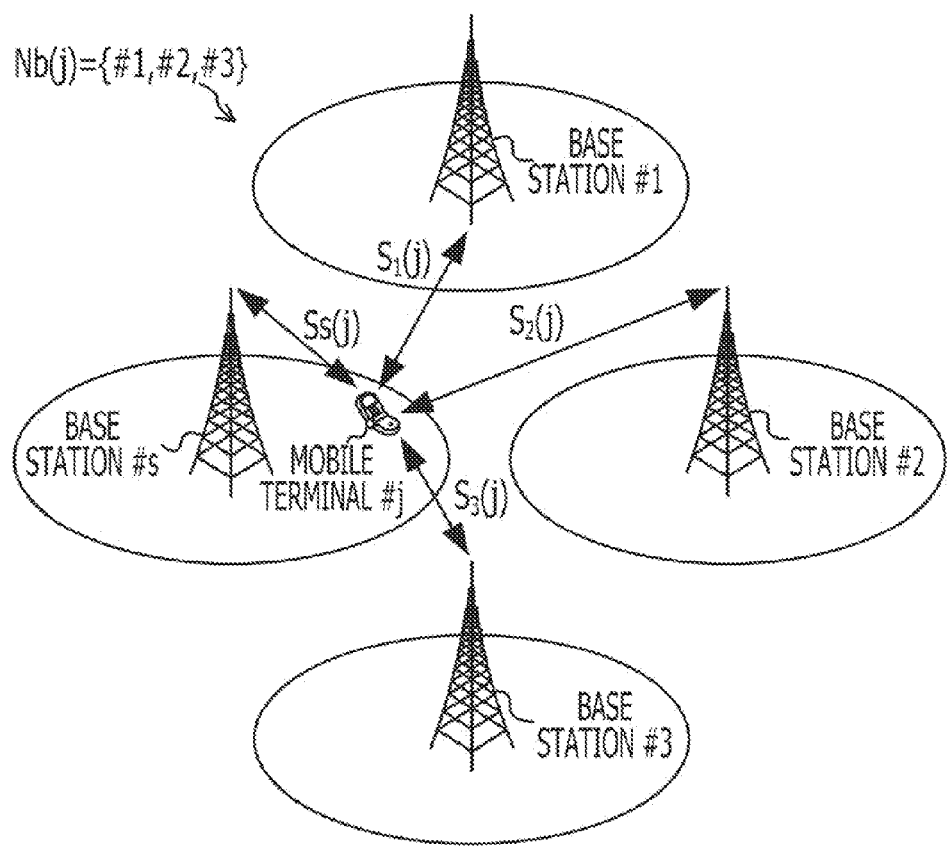
FIG. 13 illustrates examples of circumstances where at least two base stations are adjacent to a given base station in a mobile communication system according to a sixth embodiment.
Figure 14:
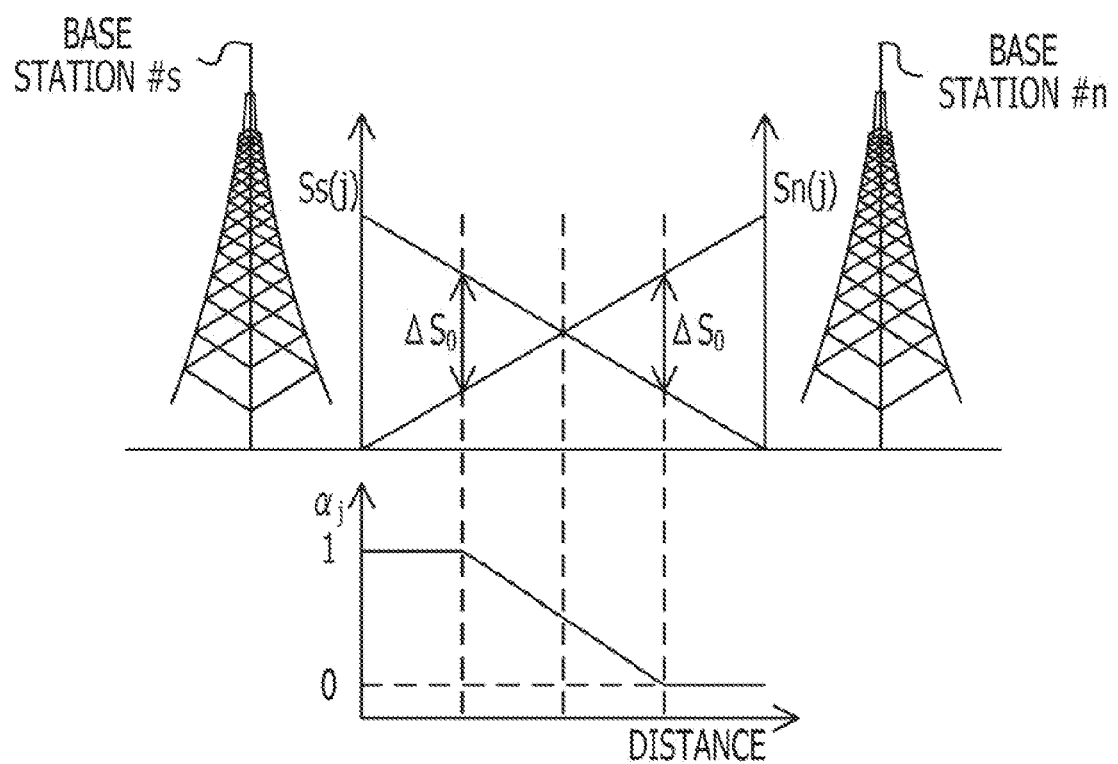
FIG. 14 illustrates an example of weight coefficient set for an average SINR of a mobile terminal moving between a communication station and an adjacent station, the example of weight coefficient changing based on power transmitted from each of the communication station and the adjacent station to the mobile terminal.

Here, a set of base stations that are adjacent to the communication station #s with which the mobile terminal #j communicates is expressed as Nb(j), and it is defined that the expression base station #n ∈ Nb(j) holds when the base station #n is a base station component included in the set Nb(j) (that is, a base station included in the set Nb(j)). FIG. 13 illustrates example of circumstances where three base stations #1, #2, and #3 are adjacent to the communication station #s, where the equation Nb(j)={#1, #2, and #3} holds. FIG. 13 further illustrates that the reception power value of a reference signal transmitted from the communication station #s to the mobile terminal #j is determined to be $S_s(j)$, and the reception power value of a reference signal transmitted from each of the adjacent stations #1 to #3 to the mobile terminal #j is determined to be $S_n(j)$ (n=1, 2, and 3). At that time, the weight coefficients $\alpha_{js}$ and $\alpha_{jn}$ are calculated according to Equations (19) and (20) that follow, where the equation $\Delta S_n = S_s(j) - S_n(j)$ holds. The sign $\Delta S_0$ denotes a parameter provided to restrict a mobile terminal for the weight assignment to a mobile terminal for which the expression $|\Delta S_n(j)| < \Delta S_0$ holds as conceptually illustrated in FIG. 14.

$$\alpha_{js} = \frac{1}{N}\left\{1 + \sum_{n \in Nb(j)} g\left(\frac{\Delta S_n(j)}{\Delta S_0}\right)\right\} \quad (19)$$

$$\alpha_{jn} = \frac{1}{N}\left\{1 - g\left(\frac{\Delta S_n(j)}{\Delta S_0}\right)\right\} \quad (20)$$

Thus, the embodiments of the present invention have been specifically described. However, without being limited to the above-described embodiments, the base station and the radio parameter-adjustment method of the present invention may be modified or changed in various ways within the scope of the spirit of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station forming a cell based on a value of a radio parameter, the base station comprising:
   a reception unit configured to receive a signal transmitted from a mobile terminal communicating with the base station; and
   an adjustment unit configured to adjust a value of a radio parameter of the base station based on first and second reception qualities of the mobile terminal, where the first reception quality is a value of a reception quality of a transmission signal of the base station and the second reception quality is a value of a reception quality of a transmission signal of another base station;
   wherein the adjustment unit adjusts the value of the radio parameter based on a value of a linear combination of the first and second reception qualities, and corrects the value of the linear combination based on a difference between a cell radius of the base station and a cell radius of the another base station.

2. The base station according to claim 1, wherein the adjustment unit changes the value of the radio parameter by as much as a specified amount, and adjusts the value of the radio parameter based on a difference between the first and second reception qualities of the mobile terminal, the first and second reception qualities being obtained before the value of the radio parameter is changed, and the first and second reception qualities of the mobile terminal, the first and second reception qualities being obtained after the value of the radio parameter is changed.

3. The base station according to claim 1, wherein the adjustment unit calculates the value of the linear combination by performing weight assignment based on a distance between the base station and the mobile terminal.

4. The base station according to claim 2, wherein the adjustment unit changes the value of the radio parameter over a plurality of times so that the value of the radio parameter is adjusted, and makes a change amount of the value of the radio parameter, the value being changed for an N+1-th (N: an integer) time, differ from a change amount of the value of the radio parameter, the value being changed for an N-th time, based on a change in each of the first and second reception qualities, the change being made when the value of the radio parameter is changed for the N-th time.

5. The base station according to claim 2, wherein the adjustment unit changes the value of the radio parameter over a plurality of times so that the value of the radio parameter is adjusted, and makes an interval between when the value of the radio parameter is changed for an N-th (N: an integer) time and when the value of the radio parameter is changed for an N+1-st time differ from an interval between when the value of the radio parameter is changed for an N−1-th time and when the value of the radio parameter is changed for the N-th time based on a change in each of the first and second reception qualities, the change being made when the value of the radio parameter is changed for the N-th time.

6. The base station according to claim 1, wherein the reception quality is an average signal to interference plus noise ratio or an average communication capacity of each of a plurality of the mobile terminals communicating with the base station.

7. A radio parameter-adjustment method used in a base station forming a cell based on a value of a radio parameter, the radio parameter-adjustment method comprising:
   acquiring first and second reception qualities of the mobile terminal communicating with the base station, where the first reception quality is a value of a reception quality of a transmission signal of the base station and the second reception quality is a value of a reception quality of a transmission signal of another base station; and
   adjusting a value of a radio parameter of the base station based on the first and second reception qualities;
   wherein adjusting the value of the radio parameter includes adjusting the value of the radio parameter based on a value of a linear combination of the first and second reception qualities and correcting the value of the linear combination based on a difference between a cell radius of the base station and a cell radius of the another base station.

8. The radio parameter-adjustment method according to claim 7, wherein adjusting the value of the radio parameter includes
   changing the value of the radio parameter by as much as a specified amount and adjusting the value of the radio parameter based on a difference between the first and second reception qualities of the mobile terminal, the first and second reception qualities being obtained before the value of the radio parameter is changed, and the first and second reception qualities of the mobile terminal, the first and second reception qualities being obtained after the value of the radio parameter is changed.

9. The radio parameter-adjustment method according to claim 7, wherein adjusting the value of the radio parameter includes calculating the value of the linear combination by performing weight assignment based on a distance between the base station and the mobile terminal.

10. The radio parameter-adjustment method according to claim 8, wherein adjusting the value of the radio parameter includes changing the value of the radio parameter over a plurality of times so that the value of the radio parameter is adjusted, and making a change amount of the value of the radio parameter, the value being changed for an N+1-th (N: an integer) time, differ from a change amount of the value of the radio parameter, the value being changed for an N-th time, based on a change in each of the first and second reception qualities, the change being made when the value of the radio parameter is changed for the N-th time.

11. The radio parameter-adjustment method according to claim 8, wherein adjusting the value of the radio parameter includes changing the value of the radio parameter over a plurality of times so that the value of the radio parameter is adjusted, and making an interval between when the value of the radio parameter is changed for an N-th (N: an integer) time and when the value of the radio parameter is changed for an N+1-th time differ from an interval between when the value of the radio parameter is changed for an N−1-st time and when the value of the radio parameter is changed for the N-th time based on a change in each of the first and second reception qualities, the change being made when the value of the radio parameter is changed for the N-th time.

* * * * *